April 24, 1962 KIKUO OKI ET AL 3,031,141

ELECTRONIC ROOT-LOCUS COMPUTING DEVICE

Filed Dec. 14, 1960 4 Sheets-Sheet 1

INVENTORS
KIKUO OKI
BY SHIGENOBU SATO
Roy C. Hopgood
ATTORNEY

April 24, 1962 KIKUO OKI ET AL 3,031,141

ELECTRONIC ROOT-LOCUS COMPUTING DEVICE

Filed Dec. 14, 1960 4 Sheets-Sheet 2

INVENTORS
KIKUO OKI
SHIGENOBU SATO
BY Roy C. Hopgood
ATTORNEY

ELECTRONIC ROOT-LOCUS COMPUTING DEVICE

INVENTORS
KIKUO OKI
SHIGENOBU SATO
BY Roy C. Hopgood
ATTORNEY

INVENTORS
KIKUO OKI
SHIGENOBU SATO
BY Roy C. Hopgood
ATTORNEY 3,031,141

ELECTRONIC ROOT-LOCUS COMPUTING DEVICE

Kikuo Oki and Shigenobu Sato, Tokyo, Japan, assignors to Nippon Electric Company Limited, Tokyo, Japan, a corporation of Japan Filed Dec. 14, 1960, Ser. No. 75,859
1 Claim. (Cl. 235—185)

This invention relates to a device for electronically recording or displaying the root-loci of a closed-loop transfer function of a feedback control system.

The root-locus method, presented by Dr. W. R. Evans in 1948, is effective in analyzing feedback control systems. However, the method is seldom used because the drawing technique of root-loci is troublesome. It is, therefore, the object of this invention to provide an electronic root-locus computing device, which automatically indicates and records root-loci of closed-loop characteristic roots as a function of the open-loop gain.

Characteristic roots may be explained as follows: If a forward pass transfer function and a feedback transfer function of a feedback control system are denoted by $K_1.G_1(s)$ and $K_2.G_2(s)$, respectively, where $K_1$ and $K_2$ are gain constants, and $G_1(s)$ and $G_2(s)$ are functions of Laplace operator $s$, an open-loop transfer function becomes $K_1.K_2.G_1(s).G_2(s)$, which has a rational term $[s^m+a_m-1s^{m-1}+ \ldots +a_1s+a_0]/[s^n+b_{n-1}s^{n-1}+ \ldots +b_1s+b_0]$ and a transcendental term $exp(-Ts)$, where $a$ and $b$ are constant coefficients, and $m$ and $n$ are integers, T is a dead time. Thus, a closed-loop transfer function is written in the form $$[K_1.G_1(s)]/[1+K_1.K_2.G_1(s).G_2(s)]$$

The characteristic equation of this system is defined as $1+K_1.K_2.G_1(s).G_2(s)=0$. The roots of this equation are closed-loop characteristic roots. These definitions are given in any theory of feedback control systems such as (1) W. R. Evans: "Graphical Analysis of Control Systems," AIEE., vol. 67, 1948, pp. 547–551;
(2) W. R. Evans: "Control System Synthesis by Root Locus Method," Trans. AIEE., 1950;
(3) "Aerodynamic Stability and Automatic Control," J. Aeronaut., Sci, vol. 18, No. 9, 1951, pp. 569–623;
(4) George J. Thaler and Robert G. Braun: "Servomechanism Analysis," McGraw-Hill, 1953, pp. 304–331;
(5) W. R. Evans: "Control-System Dynamics," McGraw-Hill, 1954;
(6) John G. Truxal: "Automatic Feedback Control System Synthesis," McGraw-Hill, 1955, pp. 221–277;
(7) "A Dynamic Root-Locus Plotter," Control Engineering, February 1956, pp. 63–65;
(8) "The Digital Computer Makes Root Locus Easy," Control Engineering, May 1958, p. 102;
(9) J. C. Gille and M. J. Pelegrin: "Feedback Control Systems, Analysis, Synthesis, and Design," McGraw-Hill, 1959, pp. 237–259;
(10) "Using the Root Locus—Part 1," Control Engineering, October 1959, pp. 96–102; and
(11) T. Jawor: "Rubber Membrane Finds Root Loci," Control Engineering, December 1959.

An electronic root-locus computing device of this invention will now be described in detail with reference to the accompanying drawings, in which.

Figure 1:
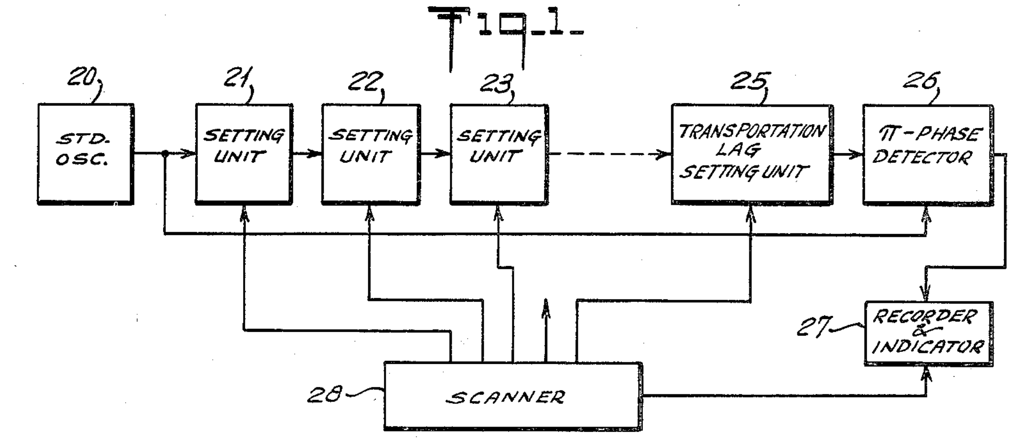
FIG. 1 is a block diagram of an embodiment of this invention.

Referring to FIG. 1, an electronic root-locus computing device of the invention comprises a standard oscillator 20, a plurality of setting units 21, 22, 23 . . . a transportation lag setting unit 25, a $\pi$-phase detector 26, a recorder-indicator 27, and a scanner 28. The standard oscillator 20 generates an electrical oscillation E, which is preferably of the sinusoidal form and is supplied therefrom to the first one 21 of the setting units and to the $\pi$-phase detector 26 as a reference oscillation, of which the frequency may be from 1 kc. to 100 kc., for example. The recorder-indicator 27 may be an X—Y recorder, a cathode-ray tube oscilloscope, a memory scope, or the like. The scanner 28 comprises two oscillators for generating electrical oscillations, of which the frequencies are lower as compared with the frequency of the reference oscillation E, being from 1/1000 c./s. to 100 c./s., for example, and are prime with each other so that the instantaneous amplitudes of these oscillations may represent the coordinates of any one point within a domain on the Laplace plane as bounded by the maximum instantaneous amplitudes thereof and may vary very slowly. It will be seen, therefore, that all the points within the domain are swept by the scanner 28 within a time interval ranging from a fraction of a second to a thousand seconds, for example. It is to be understood, however, that the sweep is so slow that the point represented by such low frequency oscillations may be considered as a fixed point during the operation of the setting units 21, 22, 23 . . . to the $\pi$-phase detector 26, and to the recorder-indicator 27, while one only of the low frequency oscillations that represent the imaginary coordinate of the points within the domain is fed to the transportation lag setting unit 25, if such is provided. The setting units 21, 22, 23 . . . , the number of which is sufficient enough to cover the number of zeros and poles of the open-loop transfer function and may be from seven to ten, for example, are electrically connected in cascade and are adapted to deal with the rational term of the open-loop transfer function when each of all the setting units concerned is preliminarily set by manual adjustment of adjustable means such as potentiometers in the manner to be described hereinafter and when the remainders of the setting units, if any on account of the fact that the number of the zeros and poles to be dealt with are less than the number of the setting units, are short-circuited by suitable switch devices (not shown) provided one for each setting unit.

Figure 2:
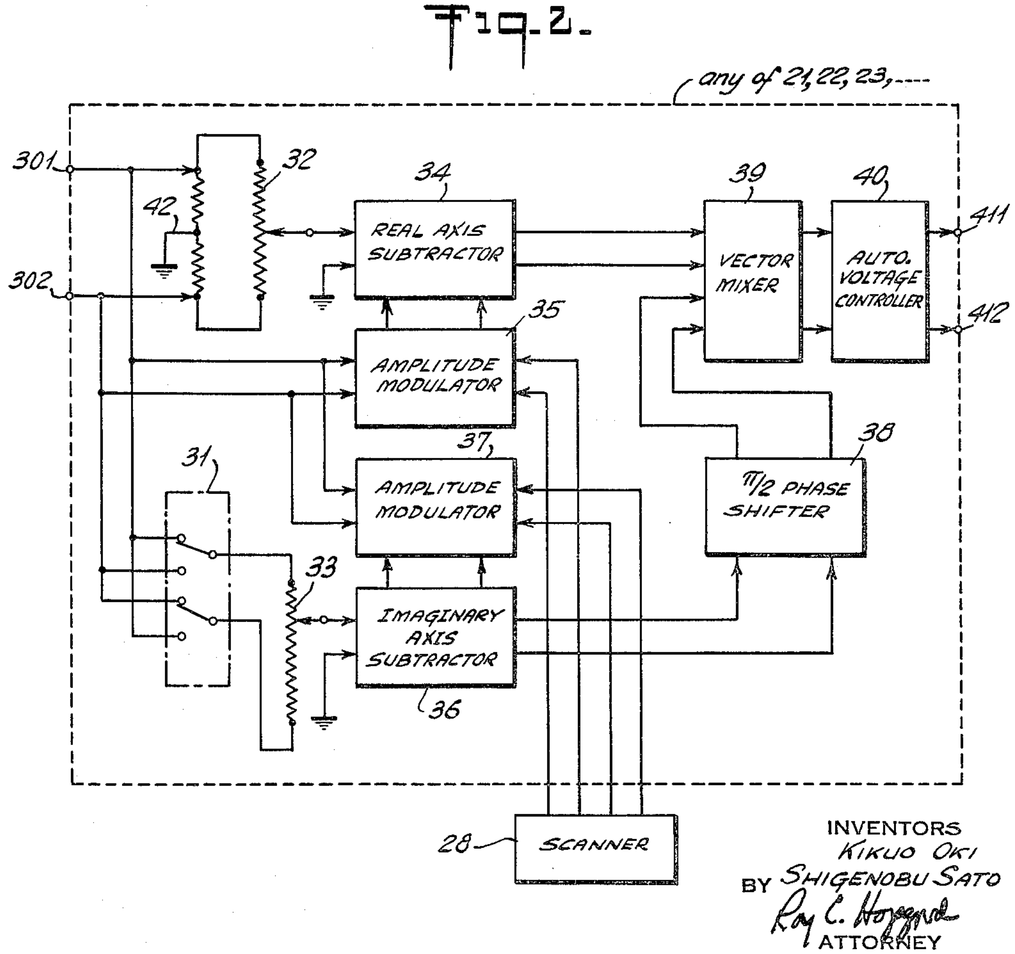
FIG. 2 shows an example of a setting unit.

Referring to FIG. 2 which shows an example of the setting units 21, 22, 23 . . . , the setting unit comprises: a pair of input terminals 301 and 302 connected to the preceding setting unit in the cascade connection or, as the case may be, to the standard oscillator 20; a zero-to-pole changer 31 connected across the input terminals 301 and 302 so that the phase of the output of the changer 31 may manually optionally be reversed from the position shown in the drawing to set in this setting unit a pole instead of a zero; a potentiometer 32 also connected across the input terminals 301 and 302 in which potentiometer the calculated value of the real axis coordinate of a zero or a pole may manually be set in accordance with the scale selected for that purpose; another potentiometer 33 connected across the output of the changer 31 in which the imaginary coordinate of a zero or a pole may be set in a similar manner; a real axis subtractor 34 supplied with the output of the potentiometer 32 and the output of an amplitude modulator 35 which in turn is supplied with the input signal and with the real axis oscillation of the scanner 28; an imaginary axis subtractor 36 supplied with the output of the potentiometer 33 and the output of an amplitude modulator 37 which in turn is connected to the input terminals 301 and 302 and the imaginary axis scanning oscillator of the scanner 28; a $\pi/2$-phase shifter 38 for shifting the phase of the output signal of the imaginary axis subtractor 36; a vector mixer 39 supplied with the outputs of the subtractor 34 and the $\pi/2$-phase shifter 38; an automatic voltage controller 40 supplied with the output of the vector mixer 39; and a pair of output terminals 411 and 412 supplied with the output of the automatic voltage controller 40 and connected to the succeeding setting unit in the cascade connection or, as the case may be, to the transportation lag setting unit 25 or to the $\pi/2$-phase detector 26. It is here assumed that the center point of the input terminals 301 and 302 is grounded as shown by 42 in FIG. 2 and that the center points of the outputs of the two oscillators in the scanner 28 are also grounded for particular use with this form of setting unit and further that the center point of the output terminals 411 and 412 is similarly grounded. Also, it will be noted that the reference oscillation E applied to such a setting unit may now be considered to represent a unit vector along the real axis, or a standard reference vector $\dot{E}$. If a zero or a pole has been set in this setting unit by manual operation of the changer 31 and the potentiometers 32 and 33, it will be understood that two electric voltages which are proportional to the real and the imaginary axis component of the vector representing the zero or the pole are fed to the subtractors 34 and 36, respectively. In the amplitude modulator 35 the input signal is modulated linearly by the real axis oscillation of the scanner 28 and becomes an amplitude modulated signal representing the real component of the scanning vector which is to be explained hereunder. On the other hand, the output signal of the amplitude modulator 36 in which the input signal is modulated linearly by the imaginary axis oscillation of the scanner 28 is an amplitude modulated signal representing the imaginary component of the scanning vector. Each of the subtractors 34 and 36 can be realized by a sort of an adder which in form can be constructed in the known manner by a simple network of resistors only and to which one of the two inputs are applied with the reversed polarity. In each of such subtractors 34 and 36, the real and the imaginary axis component of a vector which is the difference between the components of the zero or the pole vector set in the potentiometers 32 and 33 and the components of a vector whose components are equal to the instantaneous but substantially constant amplitudes of the low frequency oscillations fed from the scanner 28, are obtained.

Figure 3:
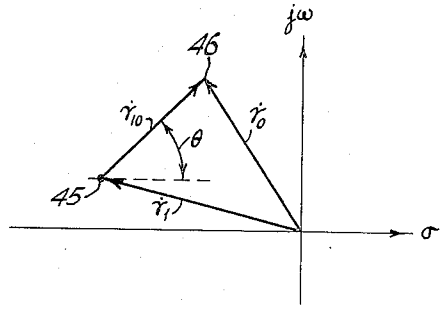
FIG. 3 is a vector diagram for explaining the operation of a setting unit.

Now referring to FIG. 3, a zero or a pole, in the shown example a pole 45, which is set in the potentiometers 32 and 33 is shown by a vector $\dot{\gamma}1$. Also, a point 46 in the domain as scanned very slowly by the scanner 28 is illustrated by a vector which can be termed a scanning vector $\dot{\gamma}0$. Then, it will be seen that the abovementioned difference vector can be represented by a vector $\dot{\gamma}10$ and that the absolute value $|\dot{\gamma}10|$ and the phase angle $\theta$ of this vector very slowly changes in accordance with the scanning vector $\dot{\gamma}0$.

It will now be understood that the components of a vector as obtained at the subtractor 34 and 36 are the components of the difference vector $\dot{\gamma}10$. The vector mixer 39 is nothing but an adder circuit similar to the subtractor except that there is a phase difference of $\pi/2$ between the inputs. The components of the difference vector $\dot{\gamma}10$, applied to such a vector mixer 39, become an oscillation whose amplitude is the vector sum of the components or the absolute value of the difference vector $\dot{\gamma}10$ and whose phase leads that of the oscillation applied to the input terminals 301 and 302 in case a zero is set in this setting unit and lags that of the input oscillation in case a pole is set therein on account of the reversal of the changer 31 by an amount which is equal to the phase difference between the zero or the pole vector and the input vector. This output oscillation of the vector mixer 39 is then applied to the automatic voltage controller 40 which may comprise a varimu tube, for example, the operating point of which in turn is controlled by the output oscillation of the vector mixer 39 in such a manner that the amplitude of the output thereof may nearly be equal to the amplitude of the input to the setting unit but that the phase of the output may be equal to that of its input, or the output of the vector mixer 39. The automatic voltage controller 40 may be dispensed with, if the number of the setting units is small, three, for example, with the result that the output of the last setting unit in the cascade connection has sufficient amplitude. If, on the other hand, any undesired phase-shift will be produced between the input and the output of all the setting units, any one or all of the automatic voltage controller may be equipped with phase-compensating means which are set so as to compensate for the undesired phase-shift. Likewise, an output oscillation of a setting unit as applied to the succeeding setting unit may now be considered to represent a unit vector along the real axis of a new Laplace plane particular to the latter setting unit, while the output of the $\pi/2$-phase shifter in the latter setting unit may now be considered to represent a reference vector along the imaginary axis of this Laplace plane.

Figure 4:
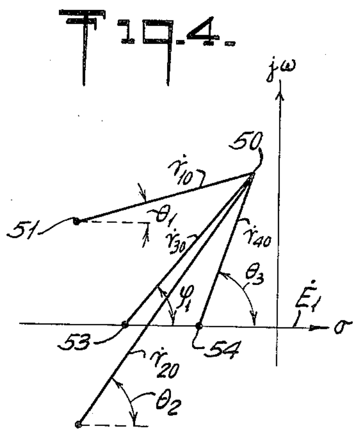
FIG. 4 is a vector diagram for explaining the operation of a set of setting units.

Now it is assumed that the open-loop transfer function has one zero and three poles. In this particular case any four of the setting units in the cascade connection are used for dealing with the rational term of the open-loop transfer function. Also, it is assumed that the very slowly scanned point which can at this time be considered as a fixed point is a point 50 shown in FIG. 4. Furthermore, although the manner in which the zero and the poles are set in the setting units is quite optional, it is assumed as shown in FIG. 4, that the roots set in the first, the second, the third, and the fourth setting unit are a pole 51, another pole 52, a zero 53, and still another pole 54, respectively. Then, it will be recalled, inasmuch as the secanned point 50 is substantially a fixed point during the operation of the setting units, that the phase-angle of the output of the first setting unit lags that of its input by an amount equal to that $\theta_1$ of the first difference vector $\dot{\gamma}10$, that the phase-angle of the output of the second setting unit with reference to the input thereto is equal to that $\theta_2$ of the second difference vector $\dot{\gamma}20$, that the phase-angle of the output of the third setting unit leads that of its input by an amount equal to that $\varphi_1$ of the third difference vector $\dot{\gamma}30$, and that the phase-angle of the output of the fourth setting unit is equal to that $\theta_3$ of the difference vector $\dot{\gamma}40$. It is to be noted that although these difference vectors should be considered on the respective Laplace planes which are particular to the respective setting units, these shown in FIG. 4 are illustrated on the original Laplace plane.

Figure 5:
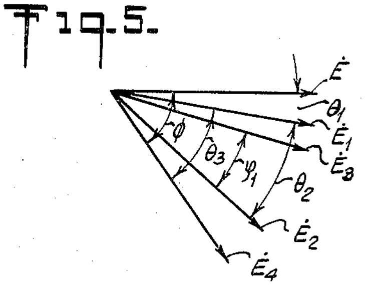
FIG. 5 is also a vector diagram for explaining the operation of the set of the setting units.

Turning now to FIG. 5, it will be seen that the output $\dot{E}_1$ of the first setting unit is shown by a vector which lags the reference vector $\dot{E}$ by the phase angle $\theta_1$, that the output $\dot{E}_2$ of the second setting unit is shown by another vector which lags the vector $\dot{E}_1$ by the phase angle $\theta_2$, that the output $\dot{E}_3$ of the third setting unit where the zero is set is shown by a vector which leads the vector $\dot{E}_2$ by the phase-angle $\varphi$, and that the output $\dot{E}_4$ of the fourth setting unit is shown by still another vector which lags vector $\dot{E}_3$ by the phase angle $\theta_3$. If the open-loop transfer function has $l$ zeros and $m$ poles in general, the phase angle $\Phi$ of the output of the $(l+m)$th or the last setting unit with reference to the reference vector E is given by the following formula:

$$\Phi=\sum_{i=1}^{l}\varphi_i-\sum_{j=1}^{m}\theta_j$$

where $\varphi_i$ is the phase angle of a vector drawn from a zero to the scanned point and $\theta_j$ is that of a vector drawn from a pole to the scanned point. This phase angle $\Phi$ of the output of the last setting unit varies very slowly in accordance with the scanning of the scanned point within the domain.

If an open-loop transfer function has a transportation lag or a distance velocity lag, the transportation lag setting unit 25 which may be omitted or short-circuited in case the open-loop transfer function to be dealt with has no transportation lag, deals with such transportation lag. The phase-angle of the transportation lag is $-T.w$, where T is the dead time and $w$ is an instantaneous amplitude of the imaginary axis oscillation of the scanner 28. The polarity of the phase-angle of the transportation lag is minus in the upper half plane, plus in the lower half plane of the Laplace plane.

Figure 7:
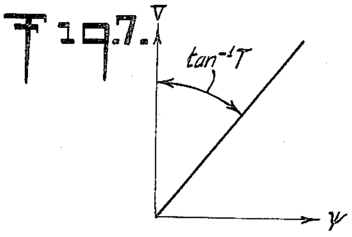
FIG. 7 is a graph for explaining the operation of a transportation lag setting unit.
Figure 6:
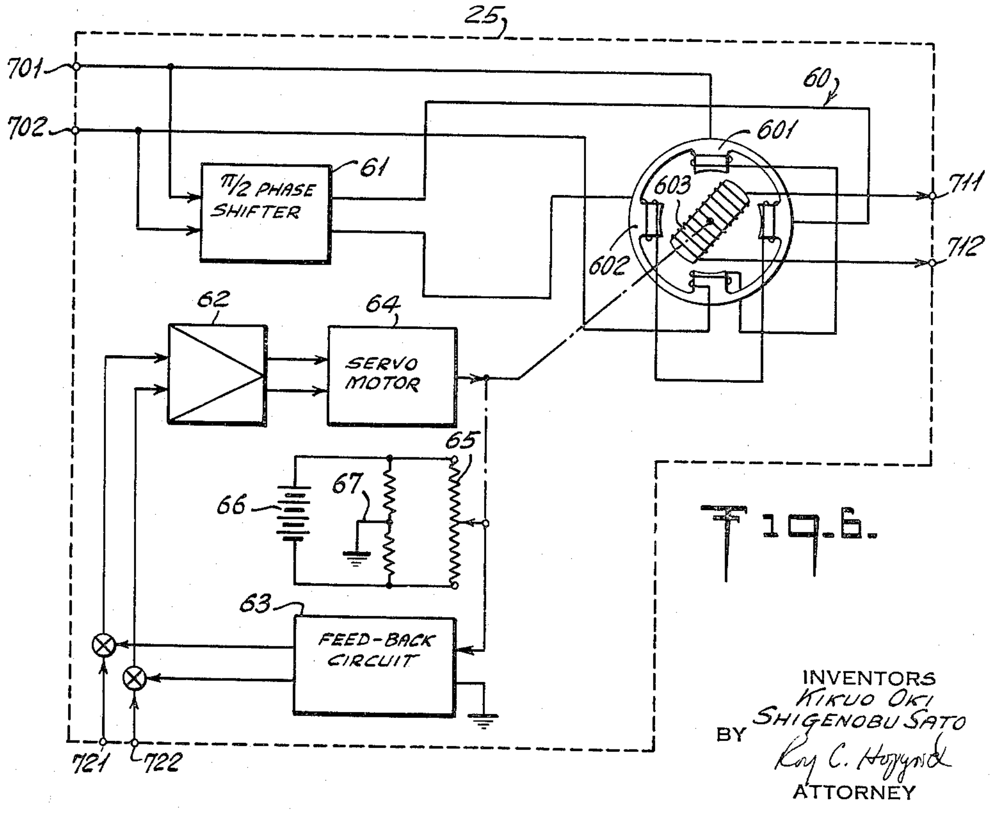
FIG. 6 shows an example of a transportation lag setting unit.

Now referring to FIG. 6, the transportation lag setting unit 25 comprises a two-phase synchro 60 of which one pair of the fixed stator windings 601 is connected through input terminals 701 and 702 of this transportation lag setting unit 25 to the output terminals of the last one of the setting units, and of which the other pair of the fixed stator windings 602 is supplied with the output of a $\pi/2$=phase shifter 61 that in turn is connected across the input terminals 701 and 702, and of which the rotor winding 603 is connected to a pair of output terminals 711 and 712, another pair of input terminals 721 and 722 connected to the imaginary axis oscillator of the scanner 28, an error signal amplifier 62 which receives and amplifies the difference or error signal between the imaginary axis oscillation supplied through the input terminals 721 and 722 from the scanner 28 and the output signal of a feedback circuit 63, and a servomotor 64 which is driven by the error signal of the amplifier 62 and mechanically rotates the rotor 603 of the synchro 60 and also moves or rotates a wiper of a potentiometer 65 for adjusting the output level of the potentiometer 65, which output in turn is supplied to the feedback circuit 63 and is amplified or otherwise adjusted thereat to be fed back to the input of the error signal amplifier 62. The potentiometer 65 is connected across a direct-current power source 66 of which the center point is grounded as shown by 67. Inasmuch as the error signal amplifier 62, the servomotor 64, the potentiometer 65 and the feedback circuit 63 form a closed-loop system, the angle of the rotation of the rotor 603 will be proportional to the instantaneous amplitude of the imaginary axis scanning oscillation. The proportional ratio is manually adjusted, for example, by a gain adjustment of a potentiometer, not shown in FIG. 6, of the feedback circuit 63 so that the relation between the angle of rotation $\chi$ of the rotor 603 and the instantaneous amplitude V of the imaginary axis scanning oscillation may be $d\psi/dV=T$ as shown in FIG. 7. Inasmuch as the two pairs of the fixed stator windings 601 and 602 of the two-phase synchro 60 are supplied with two exciting signals of which phase difference is $\pi/2$, the output of the output of the rotor 603 of the two-phase synchro 60 has the same frequency as the input signal of the terminals 701 and 702 and has the same phase-angle as the angle of rotation $\psi$ of the rotor 603 or the product of the dead time T and the coordinate of the imaginary axis or the instantaneous ampliude $w$ of the imaginary axis oscillation of the scanner 28. If the open-loop transfer function has the rational terms and the transportation lag which is a kind of the general transcendental terms, the phase angle $\Phi$ of the output of the last setting unit which, in this case, is the transportation lag setting unit 25, with reference to that of the reference vector $\dot{E}$ is given by the following formula:

$$\Phi=\sum_{i=1}^{l}\varphi_i-\sum_{j=1}^{m}\theta_j-Tw$$

Each time the resultant phase angle $\Phi$ becomes $\pi(2n+1)$, where $n$ is zero or plus or minus integer, the $\pi$-phase detector 26 feeds an output signal to the recorder-indicator 27 which is scanned by the scanner 28.

Figure 8:
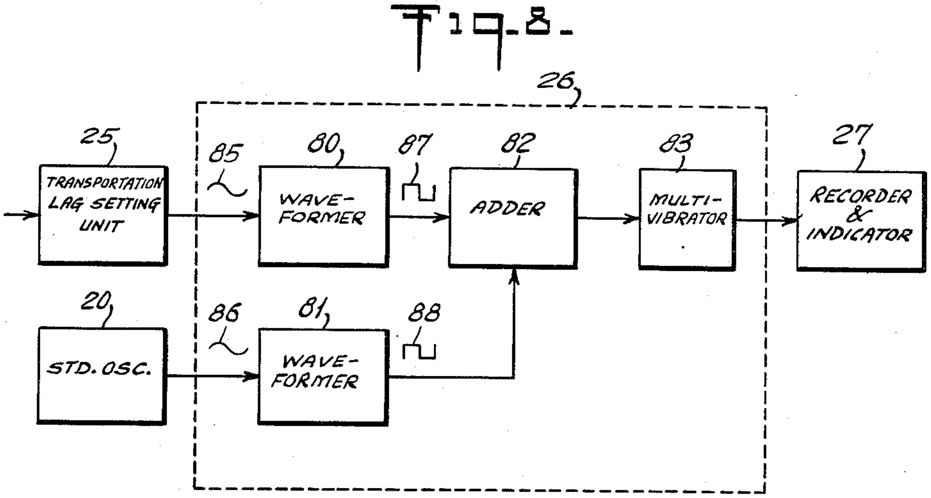
FIG. 8 shows an example of a $\pi$-phase detector.

Now referring to FIG. 8, the $\pi$-phase detector 26 comprises a wave former 80 connected to the transportation lag setting unit 25, or as the case may be, to the last setting unit, another wave former 81 connected to the standard oscillator 20, an adder 82 to which both the outputs of the wave formers 80 and 81 are fed, and a multivibrator 83. The wave formers 80 and 81 may be any of the known construction and change the sinusoidal input oscillations 85 and 86 to rectangular oscillations 87 and 88 which have substantially same amplitudes. The phase angles of these rectangular oscillations 87 and 88 are substantially same as the phase angles of the input sinusoidal oscillations 85 and 86. The adder 81 may be any of the known simple resistor network which receives the input rectangular oscillations 87 and 88, produces an output signal such that in case the phase difference between the rectangular oscillations 87 and 88 is $\pi$, is zero and in case the phase difference between the rectangular oscillations 87 and 88 is not $\pi$, is a series of pulses composed of a pair of one positively going and one negatively going pulses, whose pulse width varies in accordance with the phase difference and whose repetition period is the same as the frequency of the reference oscillation E. Such output signal is fed then to the multivibrator 83 which is of known construction and which is so arranged that it may produce its output signal in case there is no input thereto and that it may not produce its output signal in case there is any input of the pulse form. Thus, it will be seen that the $\pi$-phase detector 26 produces an output signal each time the resultant phase angle $\Phi$ of the output of the cascade connection of the setting units 21, 22, 23, . . . and the transportation lag setting unit 25, if any, is $\pi(2n+1)$.

If the recorder-indicator 26 is an indicator comprising a cathode-ray tube oscilloscope, the output signal of the $\pi$-phase detector 26 can be used as the beam intensity modulation signal of the cathode-ray tube oscilloscope. By so arranging that the horizontal and the vertical axis of the cathode-ray tube oscilloscope are scanned by the real and the imaginary axis oscillation of the scanner 28, it will now be understood that sequences of intensity modulated spots which are equivalent to the continuous root loci of roots of the closed-loop transfer function and of which coordinates on the screen of the cathode-ray tube satisfy the closed-loop characteristic equation $1+K_1.K_2.G_1(s).G_2(s)=0$ will appear on the screen of the cathode-ray tube oscilloscope. Inasmuch as the root-loci also satisfy the gain condition which is defined by $$|G_1(s).G_2(s)|=|-1/K_1.K_2|$$

as described by Evans, the root-loci given by the above-mentioned phase condition on the screen of the cathode-ray tube oscilloscope are the loci representing the variation of the roots of the closed-loop transfer function, when the gain constant $K_1.K_2$ of the given open-loop transfer function vary from zero to infinity.

Figure 9:
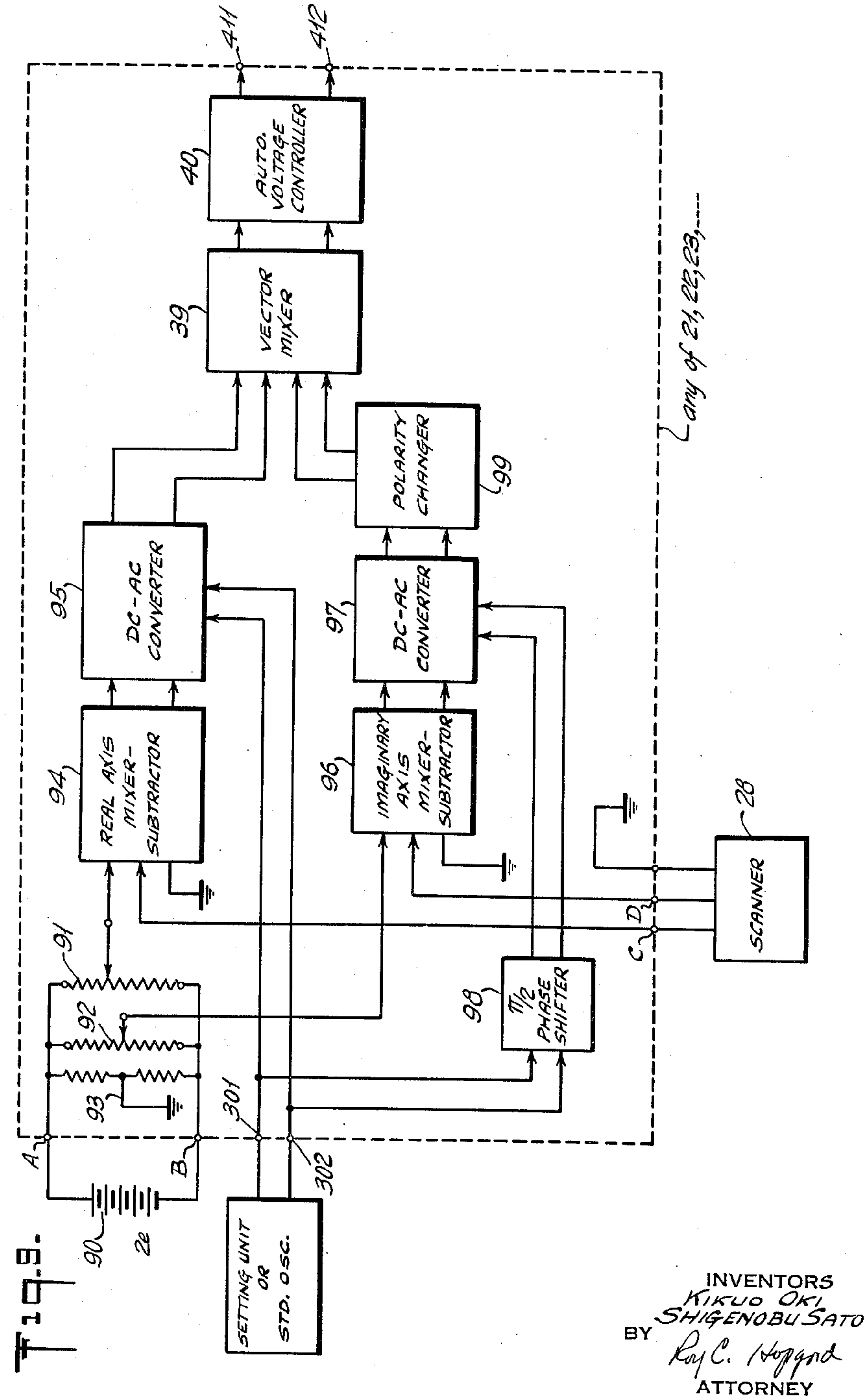
FIG. 9 shows another example of a setting unit.

Referring now to FIG. 9 which shows another example of any one of the setting units 21, 22, 23 . . . , the setting unit comprises terminals A and B connected to a direct-current power source 90 of $2e$ volts which may be 20 v., for example, and manually adjustable potentiometers 91 and 92. The center point of the terminals A and B is grounded as shown by 93, so that the outputs of the potentiometers 91 and 92 vary from $-e$ volts to $+e$ volts according to the positions of their wipers. Two electrical voltages proportional to the real and the imaginary coordinate of a zero or a pole of the given open-loop transfer function are obtained by manual adjustment of the wipers of the potentiometers 91 and 92, respectively. The output direct-current signal of the potentiometer 91 and the real axis scanning signal of the scanner 28 supplied through a terminal C are fed to a real axis mixer-subtractor 94 of which the output is fed to a real axis direct-current to alternate-current converter (a D.C.-A.C. converter) 95. The real axis mixer-subtractor 94 may comprise a resistor circuit in which the output of the potentiometer 91 is subtracted from the real axis scanning signal, and of which the output is equivalent to the absolute value of the real axis component of the above-mentioned difference vector $\dot{\gamma}10$. The D.C.-A.C. converter 95 is supplied with, besides the output of the real axis mixer-subtractor 94, the output of the preceding setting unit in the cascade connection or, as the case may be, of the standard oscillator 20. The D.C.-A.C. converter 95 may be an amplitude modulator that receives two input signals, one of which is a direct-current signal and the other of which is an alternate-current signal and produces an output alternate-current signal of which the amplitude is of the same value as that of the input direct-current signal and of which the phase angle and the frequency are all the same as the phase angle and the frequency of the input alternate-current signal, respectively. It will now be seen that the output of the D.C.-A.C. converter 95 is equivalent to the real axis component of the difference vector $\dot{\gamma}10$. On the other hand, an imaginary axis mixer-subtractor 96, which is of the same construction as the real axis mixer-subtractor 94, is supplied with the output direct-current signal of the potentiometer 92 and the imaginary axis scanning signal supplied through a terminal D from the scanner 28. Therefore, the output of the imaginary axis mixer-subtractor 96 becomes the absolute value of the imaginary component of the difference vector $\dot{\gamma}10$. Another D.C.-A.C. converter 97 is supplied with the output of the mixer-subtractor 96 and with the output of a $\pi/2$ phase shifter 98 which shifts the phase of the output of the preceding setting unit or, as the case may be, the standard oscillator 20 by $\pi/2$. It will also be understood that the output of the D.C.-A.C. converter 97 is equivalent to the imaginary axis component of the difference vector $\dot{\gamma}10$. This output is fed to a polarity changer 99 which may be a manually operable switch for shifting the phase of the input or the output of the D.C.-A.C. converter 97 by $\pi$ according to that the set root in this setting unit is a zero or a pole. The vector mixer 39 and the automatic voltage controller 40 are the same circuits as shown in FIG. 2. The vector mixer 39 supplied with the output of the D.C.-A.C. converter 95 and the output of the polarity changer 99 produces an output which is the electrical signal representing the difference vector $\dot{\gamma}10$. In the automatic voltage controller 40 supplied with the output of the vector mixer 39, the amplitude of its input signal is amplified or otherwise adjusted so as to maintain substantially constant the level of the signals passing through the setting unit while keeping the phase of the output signal of the controller 40 the same as that of its input signal. The output signal of the automatic voltage controller 40 becomes the substantially constant level signal of which the phase is equal to that of the difference vector $\dot{\gamma}10$.

Figure 10:
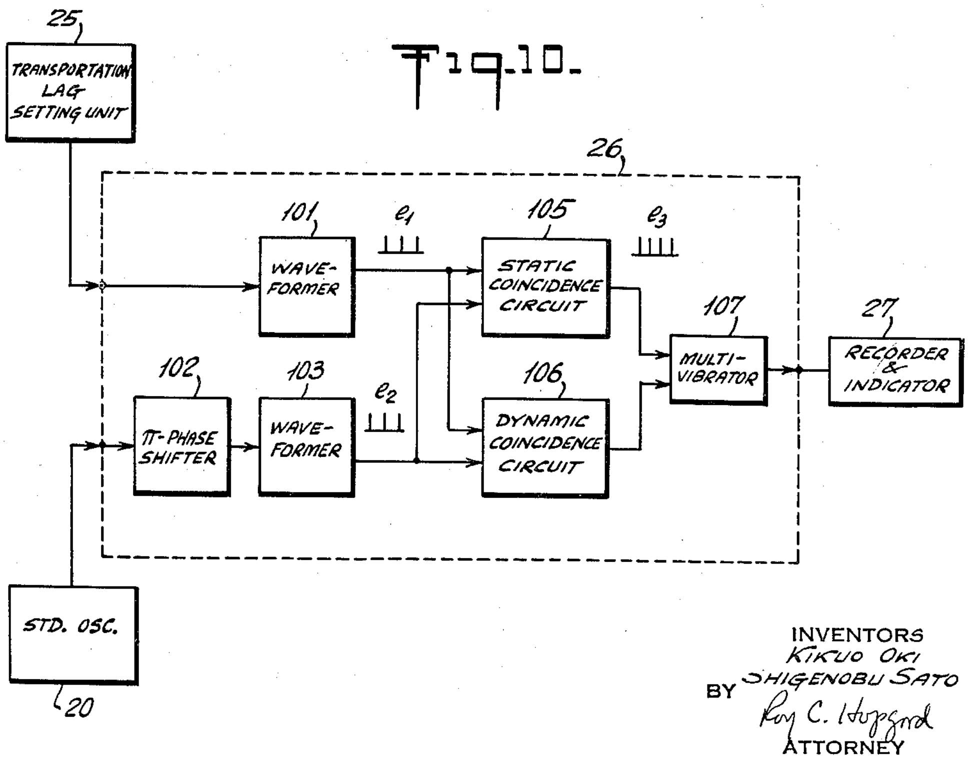
FIG. 10 shows another example of a $\pi$-phase detector.

Referring to FIG. 10 which shows another example of the $\pi$-phase detector 26, there are a wave former 101 supplied with the output of the transportation lag setting unit 25 or, as the case may be, to the last setting unit, a $\pi$-phase shifter 102 is connected to the standard oscillator 20 and to another wave former 103, a static coincidence circuit 105 and a dynamic coincidence circuit 106, each of which is supplied with the outputs of the wave formers 101 and 103, and a multivibrator circuit 107 which is supplied with the outputs of the static coincidence circuit 105 and the dynamic coincidence circuit 106 and which is connected to the recorder-indicator 27. The wave former 101 may be any of the known construction and changes the output waveform of the transportation lag setting unit 25 to a series of pulses $e_1$. The positions of these pulses $e_1$ are equal to the instantaneous time points at which the alternate-current output signal of the transportation lag setting unit 25 goes from the negative side through the zero voltage level to the positive side. The pulse width will be from 1/100 microsecond to 1 microsecond, for example. Inasmuch as the $\pi$-phase shifter 102 shifts the reference oscillation E of the standard oscillator 20 by $\pi$, the output signal of the $\pi$-phase shifter 102 becomes the reversed reference oscillation −E. The wave former 103 has the same construction as the wave former 101 and converts the input signal or the output of the $\pi$-phase shifter 102 to another series of pulses $e_2$. Thus, the wave formers 101 and 103 feed the pulse series $e_1$ and $e_2$ to the static coincidence circuit 105 and the dynamic coincidence circuit 106. It is to be noted here that the phase of the output $e_1$ of the wave former 101 varies in accordance to the values of the open-loop roots and the scanning factor and that the phase of the output $e_2$ of the wave former 103 is constant. At the static coincidence circuit 105 the pulses $e_1$ and $e_2$ are added, when these pulse signals $e_1$ and $e_2$ coincide with each other, and the height of the pulses $e_3$ produced thereat becomes larger than those of the pulses $e_1$ and $e_2$. When the coincidence of the pulse signals $e_1$ and $e_2$ happens statically, the multivibrator 107 produces a series of output pulses which in turn are fed to the recorder-indicator 27, due to the fact that the multivibrator 107 comprises such a circuit that is driven only by the above-mentioned large trigger pulse. In case the scanning point passes by a pole or a zero and the phase variation of the pulse signal $e_1$ is accordingly rapid, the output pulse level of the static coincidence circuit 105 is low, so that this output trigger pulse $e_3$ cannot drive the multivibrator 107. Therefore, the dynamic coincidence circuit 106 is used together with the static coincidence circuit 105. The dynamic coincidence circuit 106 has a circuit which detects the fact that the pulse signal $e_1$ crosses the pulse signal $e_2$ during one cycle of the pulse signal $e_2$, or the fact that there are two successive $e_2$ pulses between two successive $e_1$ pulses. For this reason, even if the phase variation of the pulse signal $e_1$ is very large, the dynamic coincidence circuit 106 can detect the coincidence of the pulse signals $e_1$ and $e_2$ or the $\pi$-phase difference between $e_1$ and $e_2$ and thus drive the multivibrator 107. In any case, this form of the $\pi$-phase detector 26 can also perform the like operation as that shown in FIG. 8.

While the foregoing description sets forth the principles of the invention in connection with specific apparatus, it is to be understood that this description is made only by way of example and not as a limitation of the scope of the invention as set forth in the objects thereof and in the accompanying claim.

What we claim is:

An electronic root-locus computing device for automatically recording or indicating on a recording or indicating medium continuous loci of the characteristic roots of a closed-loop transfer function within a domain on the Laplace plane by way of, as a parameter, the gain constant of an open-loop transfer function pertaining to said closed-loop transfer function, comprising a standard oscillator for generating an electrical reference oscillation, a plurality of setting units, said standard oscillator and said setting units being connected in cascade, a scanner which comprises two oscillators for generating lower frequency oscillations as compared with the frequency of said reference oscillation, said lower frequencies being relatively prime with each other and the instantaneous amplitudes of said lower frequency oscillations continuously representing the coordinates along the real axis and the imaginary axis of any points within said domain as bounded by the maximum instantaneous amplitudes of the lower frequency oscillations, each of said setting units being adapted to be manually set therein two electrical signals representing the coordinates of a pole or a zero of said open-loop transfer function, to derive therein the differences between the corresponding one of said two electrical signals and the components obtained by amplitude modulation of the input signal which is applied thereto from either said standard oscillator or the setting unit just preceding thereto in the cascade connection with said lower frequency oscillations which are applied thereto from said scanner, and to derive an output signal which is the vector sum of said differences, a $\pi$-phase detector connected to the last one of said setting units, in the cascade connection and to said standard oscillator for deriving an output signal each time when the phase difference between the output signal of the last one of said setting units and the reference oscillation is $$\pi+2n\pi(n=0,\pm1,\pm2\ \ldots)$$

and a recorder or indicator connected to said $\pi$-phase detector and to said scanner for recording or indicating on a recording or indicating medium the output of said $\pi$-phase detector one after another with respect to the amplitude of said lower frequency oscillations.

No references cited.